United States Patent
Clay

(10) Patent No.: US 12,276,783 B2
(45) Date of Patent: Apr. 15, 2025

(54) LIGHT EXPANDER/CONTRACTOR DEVICE AND METHOD OF USING SAME

(71) Applicant: Spacedesign Corporation, Houston, TX (US)

(72) Inventor: Joseph Michael Clay, Houston, TX (US)

(73) Assignee: Spacedesign Corporation, Houston, TX (US)

( * ) Notice: Subject to any disclaimer, the term of this patent is extended or adjusted under 35 U.S.C. 154(b) by 670 days.

(21) Appl. No.: 17/502,983

(22) Filed: Oct. 15, 2021

(65) Prior Publication Data

US 2022/0035148 A1 Feb. 3, 2022

Related U.S. Application Data

(60) Division of application No. 12/850,940, filed on Aug. 5, 2010, now abandoned, which is a continuation of
(Continued)

(51) Int. Cl.
| | | |
|---|---|---|
| *G02B 26/08* | (2006.01) | |
| *F03G 7/00* | (2006.01) | |
| *G02B 5/04* | (2006.01) | |

(52) U.S. Cl.
CPC ............ *G02B 26/0816* (2013.01); *G02B 5/04* (2013.01); *G02B 5/045* (2013.01); *G02B 26/0883* (2013.01); *F03G 7/016* (2021.08)

(58) Field of Classification Search
CPC ........... F03G 7/016; G02B 5/04; G02B 5/045; G02B 26/0883
See application file for complete search history.

(56) References Cited

U.S. PATENT DOCUMENTS 5,168,401 A * 12/1992 Endriz ............... G02B 19/0057
359/627
5,481,686 A 1/1996 Dockser
(Continued)

OTHER PUBLICATIONS

"Asm Labels," (Mar. 19, 1996) located at website:euch6h.chem.emory.edu/services/gcc/html/Asm-Specification notes accompanying release of the Gnu C complier; Cygnus SolutionsInc.
(Continued)

*Primary Examiner* — George G. King
*Assistant Examiner* — Anna Smith
(74) *Attorney, Agent, or Firm* — The Morris Law Firm, PC; Paula Morris

(57) ABSTRACT

The application provides a light expander/contractor device and method of using same, the light expander/contractor device comprising: a faceted quartz structure comprising a lateral surface communicating with a light processing surface at one end and communicating with a planar surface at an opposed end; the light processing surface comprising an initial surface extending from the lateral surface substantially parallel to the planar surface and having a distal end spaced from the lateral surface, the light processing surface further comprising multiple levels of facets comprising quartz-air interfaces: each level of facets comprising (a) a proximal facet surface relative to the lateral surface, the proximal facet surface extending away from the initial surface and toward the lateral surface at a 45° angle relative to the initial surface to communicate with (b) a facet planar surface spaced apart from and parallel to the initial surface to communicate with (c) a distal facet surface adjacent and substantially parallel to the proximal facet surface.

14 Claims, 9 Drawing Sheets

Related U.S. Application Data application No. 10/836,774, filed on Apr. 30, 2004, now abandoned, which is a continuation-in-part of application No. 10/393,114, filed on Mar. 19, 2003, now abandoned.

(60) Provisional application No. 60/365,470, filed on Mar. 19, 2002.

(56) References Cited

U.S. PATENT DOCUMENTS

| | | | |
|---|---|---|---|
| 5,633,998 | A | 5/1997 | Schlafly |
| 5,729,724 | A | 3/1998 | Sharangpani |
| 5,740,093 | A | 4/1998 | Sharangpani |
| 5,761,105 | A | 6/1998 | Goddard |
| 5,774,726 | A | 6/1998 | Ahmed |
| 5,812,439 | A | 9/1998 | Hansen |
| 5,819,097 | A | 10/1998 | Brooks |
| 5,859,998 | A | 1/1999 | Lynch |
| 5,884,070 | A | 3/1999 | Panwar |
| 5,901,316 | A | 5/1999 | Goebel |
| 6,009,263 | A | 12/1999 | Golliver |
| 6,021,273 | A | 2/2000 | Griesemer |
| 6,131,107 | A | 10/2000 | Wolrich |
| 6,212,678 | B1 | 4/2001 | Marsden |
| 6,452,731 | B1* | 9/2002 | Schorning ............... G02B 5/045 |
| | | | 359/837 |
| 6,616,305 | B1* | 9/2003 | Simon ..................... F21V 5/046 |
| | | | 362/268 |
| 2003/0225398 | A1* | 12/2003 | Zepkin ............... G02B 26/0816 |
| | | | 606/4 |

OTHER PUBLICATIONS

"Assembler Instructions with C Expression Operands," (Oct. 5, 1997) located at website: www.cygnus.com/pubs/gnupro/2; and "Asm Labels" (Mar. 19, 1996) located at website: euch6h.chem.emory.edu/services/gcc/html/Asm-specification notes accompanying releases of the Gnu C compiler; Cygnus SolutionsInc.

"Assembler Instructions with C Expression Operands," (Oct. 5, 1997) Located at website: www.cygnus.com/pubs/gnupro/2.

Gal et al., "An Accurate Elementary Mathematical Library for the IEEE Floating-Point Standard", ACM Transactions on Mathematical Software, vol. 17, No. 1, Mar. 1991pp. 26-45.

Intel C/C++ and FORTRAN Compilers; white paper-copyright 1997Intel Corporation.

Kang et al., "Fixed-Point C Compiler for TMS320C50 Digial Signal Processor", ICASSP—1997, IEEE, Apr. 1997pp. 707-710.

Markstein et al., "Wide Format Floating-Point Math Libraries", ACM, 1991pp. 130-138.

Morales, "An SBNR Floating-Point Convention", IEEE 1998, pp. 6-10.

Sung et al., "Fixed-Point C Language for Digital Signal Processing", Proceedings of Asilomar-29, IEEE, 1996pp. 816-820.

White Paper, "Intel C/C++ and FRTRAN Compilers", Intel 1997, Retrieved from the Internet Dec. 11, 1997) : <http://developer.intel.com/design/perftool/icl24/icl24wht.html>.

Yernaux et al., "A High-Speed 22-bit Floating-Point Digital Signal Processor", ISCAS'88, IEEE1988<pp. 65-68.

* cited by examiner

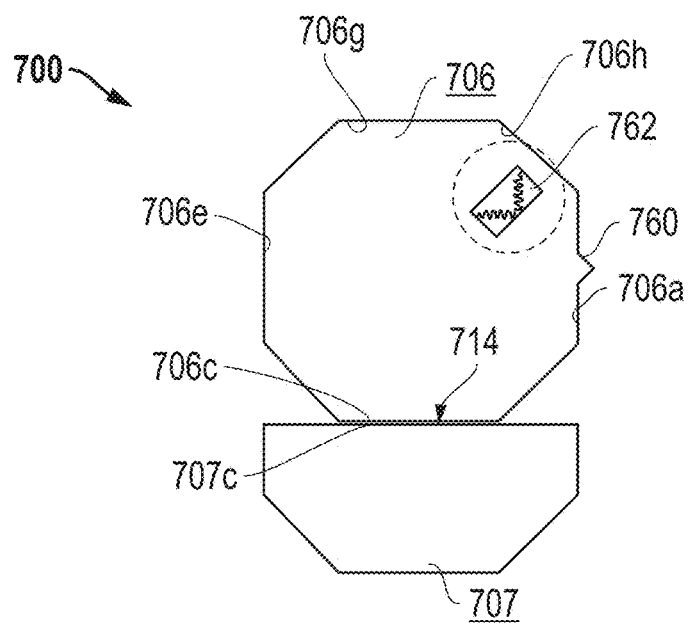
*FIG. 7A*
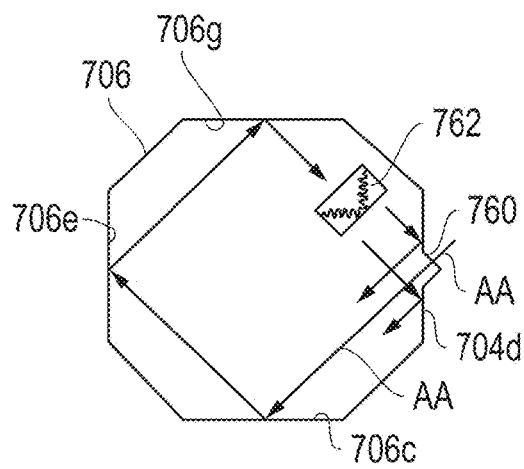 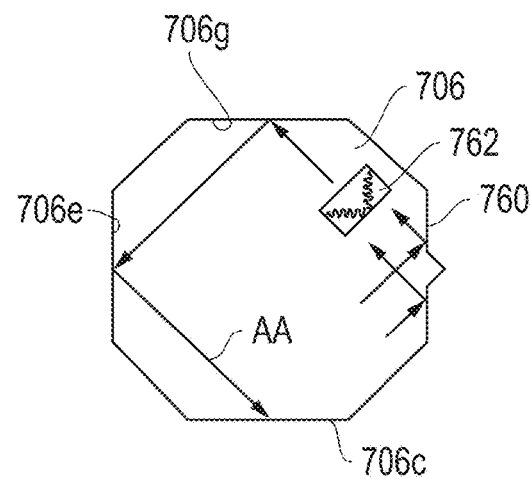
*FIG. 7E*        *FIG. 7F*

LIGHT EXPANDER/CONTRACTOR DEVICE AND METHOD OF USING SAME

This application is a divisional of and claims the benefit of U.S. Utility application Ser. No. 12/850,940 (now pending), filed on Aug. 5, 2010, which application is a continuation of and claims the benefit of U.S. Utility application Ser. No. 10/836,774, filed on Apr. 30, 2004 (abandoned), which application is a continuation-in-part of U.S. Utility application Ser. No. 10/393,114, filed on Mar. 19, 2003 (abandoned), which claims the benefit of Provisional Patent Application Ser. No. 60/365,470, filed on Mar. 19, 2002. The above applications are hereby incorporated by reference for all purposes and made a part of the present disclosure.

BACKGROUND OF THE INVENTION

The present invention relates generally to a light expander/contractor device and method of using same.

BRIEF SUMMARY OF THE INVENTION

In one embodiment, the application provides a light expander/contractor device and method of using same, the light expander/contractor device comprising: a faceted quartz structure comprising a lateral surface communicating with a light processing surface at one end and communicating with a planar surface at an opposed end; the light processing surface comprising an initial surface extending from the lateral surface substantially parallel to the planar surface and having a distal end spaced from the lateral surface, the light processing surface further comprising multiple levels of facets comprising quartz-air interfaces: each level of facets comprising (a) a proximal facet surface relative to the lateral surface, the proximal facet surface extending away from the initial surface and toward the lateral surface at a 45° angle relative to the initial surface to communicate with (b) a facet planar surface spaced apart from and parallel to the initial surface to communicate with (c) a distal facet surface adjacent and substantially parallel to the proximal facet surface.

In one embodiment, the application provides a light expander/contractor device comprising: a cylindrical faceted quartz structure comprising a lateral surface communicating with a light processing surface at one end and communicating with a planar surface at an opposed end; the light processing surface comprising an initial surface extending from the lateral surface substantially parallel to the planar surface and having a distal end spaced from the lateral surface, the light processing surface further comprising multiple levels of facets comprising quartz-air interfaces: each level of facets comprising (a) a proximal facet surface relative to the lateral surface, the proximal facet surface extending away from the initial surface and toward the lateral surface at a 45° angle relative to the initial surface to communicate with (b) a facet planar surface spaced apart from and parallel to the initial surface (c) a distal facet surface adjacent and substantially parallel to the proximal facet surface; wherein the distal facet surfaces of penultimate facets intersect to form a V structure.

These and other features and advantages of the present invention will be apparent to those skilled in the art from the following Detailed Description of preferred embodiments, and the drawings.

BRIEF DESCRIPTION OF THE DRAWINGS

FIG. 6b is a side elevation view of the apparatus in FIG. 6a;

FIG. 7a is a simplified schematic illustrating an alternative primary prism and secondary prism of a photo engine, according to the present invention.

FIG. 7e is a simplified illustration of operation of the light expander of the primary prism, according to the invention;

FIG. 7f is a simplified illustration of operation of the light contractor of the primary prism, according to the invention;

DETAILED DESCRIPTION OF THE INVENTION

Figure 1:
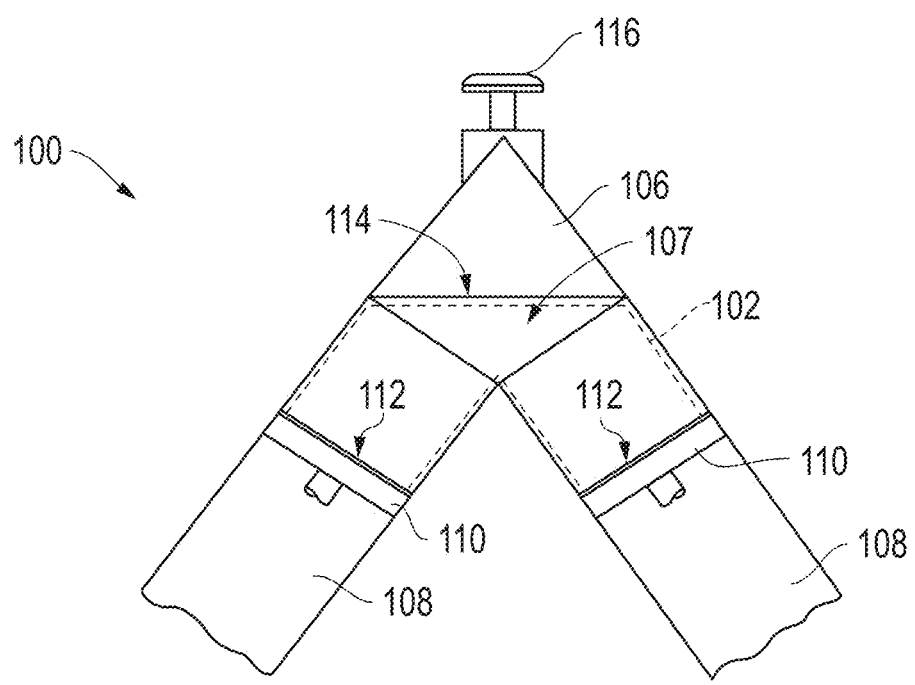
FIG. 1 is simplified schematic of an apparatus, such as a photon engine, for utilizing radiation pressure associated with light waves to generate mechanical work, according to the present invention.

FIGS. 1-7 are provided to illustrate an apparatus and/or method according to the present invention. Various aspects of the invention are embodied in these Figures.

The present invention relates generally to the utilization of radiation pressure inherent or obtainable from a light wave to produce work, for example, mechanical work. The source of this radiation pressure is provided by a light source, or more specifically, propagating electromagnetic waves directed from a light source into or within the apparatus of the invention. The present invention also relates generally to methods and apparatus for communicating or otherwise manipulating such light waves. Operation of a photon engine of the invention entail employment of this aspect of the invention. Generally, the electromagnetic waves are directed into a containment chamber through at least one operable prism that functions in a switching mode. In a preferred embodiment, a primary prism and a secondary prism are used, and are operated together to provide a light switch injection valve, which either reflects light entering the first prism or passes light into the containment chamber.

Operation of the light switch (discussed below in respect to FIGS. 1-7) is based on an optical phenomenon wherein two individual media (i.e., prisms) may be compressed along an interface so that the media combined act as one. First, light is introduced into the primary prism at a predetermined angle. With the light switch in the closed or non-operative mode, the light reflects off a back face or wall of the primary prism. To open the switch and place it in the operative mode, the primary and secondary prisms, i.e., the first and second individual media, are compressed against each other (or more particularly, the secondary prism compresses against or toward the primary prism) through operation of an external driving device. In doing so, the boundary between the two prisms, i.e., the common face, is removed, and the two media function as one. Typically, this boundary may be formed or provided by an air gap or vacuum (in the closed mode) having an index of refraction different from the prism material. Light directed into a first prism, therefore, passes through the boundary with the second prism, through the second prism and enters a containment chamber. It is further advantageous to direct light into the primary prism at a predetermined angle so that the light enters and then propagates within the containment chamber at an angle that is normal to a reflective mirror movably mounted within the chamber.

With light contained in the containment chamber, the light switch is closed. Thus, the light wave or light in the containment chamber maintains columniation and continuously propagates therein. More precisely, the contained light reflects off a first reflective mirror at a normal angle, then against a face of the secondary prism at a nearly 45° angle or other predetermined angle, and then reflects off a second mirror also at a normal angle. These three reflections make up one full cycle which is repeated within a known, predetermined time frame. The time frame also preferably corresponds to ½ of the operating frequency of the light switch: between opened and closed modes. During each cycle, the light cycles between the three reflective surfaces at a high rate so that radiation pressure is transmitted to or through the two mirror surfaces thereby converting or translating the energy of the light wave to mechanical work, i.e., movement of the mirror. In preferred embodiments, the mirror is operatively connected to a piston and contained in a cylinder assembly the cylinder preferably does not absorb the light) so as to operate as an engine.

To facilitate description of the invention, a brief explanation of certain concepts is first provided.

The light wave which is the object of the inventive method is an electromagnetic wave. Electromagnetic waves transport linear momentum making it possible to exert a mechanical pressure on a surface by shining a light on it the surface. It should be understood that this pressure is small for individual light photons. But given a sufficient number of photons a significant mechanical pressure may be obtained.

Maxwell (J.C.) showed the resulting momentum p for a parallel beam of light that is totally absorbed is the energy U divided by the speed of light c.

$$p = \frac{U}{c} \tag{1}$$

If the light beam is totally reflected the momentum resulting at a normal incidence to the reflection is twice the total absorbed value.

$$p = \frac{2U}{c} \tag{2}$$

These examples represent the two ends of the spectrum for momentum transfer. At one end the totally absorbed beam demonstrates the totally inelastic case where the particles stick together and the most kinetic energy is lost, typically, to another form of energy such as thermal energy or deformation. At the other end of the spectrum, a totally reflected beam demonstrates a completely elastic collision where kinetic energy is conserved.

Figure 2:
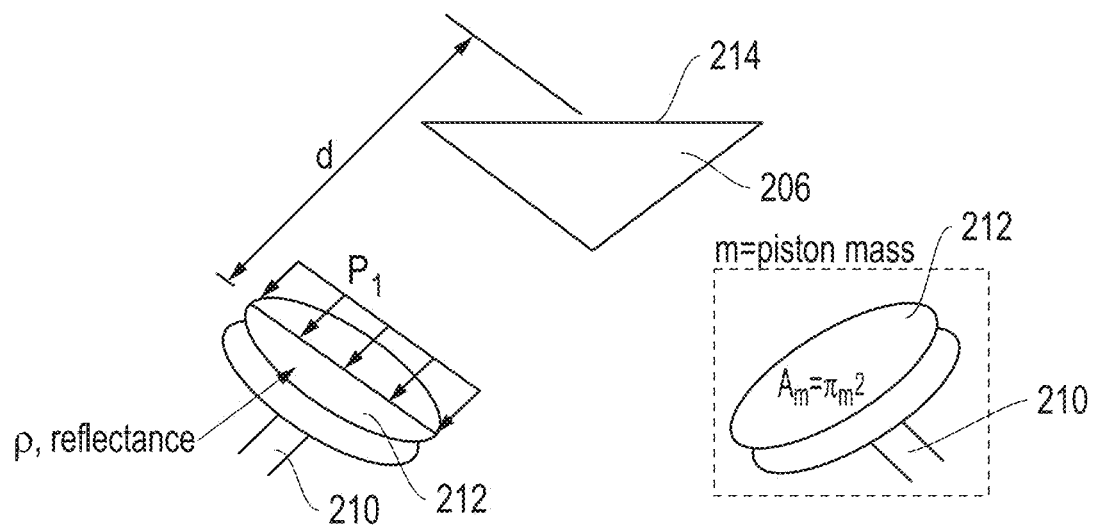
FIG. 2 is a simplified schematic of one embodiment of a piston assembly suitable for use with the inventive apparatus.

With reference to FIG. 2, the following sections provide calculations on the power produced by an apparatus and method, i.e. an engine, according to the invention. The calculations can be divided into four sections: Force (F); Time (T); Work (W); and Power (P).

The following details the force calculation on a single mirror, with surface area, $A_m$, and an initial radiation pressure entering the containment chamber, $p_1$, until the radiation pressure is effectively zero after z number of bounces.

$$F_{0-z} = p_1 A_m + p_2 A_m + p_3 A_m + \ldots + p_z A_m \tag{3}$$

The relationship between each radiation pressure bounce can be represented as a function of surface reflectance, ρ.

$$p_2 = \rho p_1, \; p_3 = \rho p_2, \; p_4 = \rho p_3, \ldots, p_z = \rho p_{z-1} \tag{4}$$

Inserting the radiation pressure relationship between bounces off all surfaces results in the following relationship:

$$F_{0-z,total} = p_1 A_m + \rho p_1 A_m + \rho^2 p_1 A_m + \ldots + \rho^z p_1 A_m \tag{5}$$

or $$F_{0-z,total} = \sum_{n=0}^{z} \rho^n p_1 A_m \tag{6}$$

For a single mirror every fourth bounce should be added to the force calculation:

$$F_{0-z,singlemirror} = p_1 A_m + \rho^4 p_1 A_m + \rho^8 p_1 A_m + \ldots + \rho^{4z/4} p_1 A_m \tag{7}$$

or $$F_{0-z,singlemirror} = \sum_{n=0}^{z/4} \rho^{4n} p_1 A_m \tag{8}$$

The time or duration of the force is found by dividing the distance the light travels by the velocity of light.

$$t = \frac{zd}{c} \tag{9}$$

The work of a resultant force on a body equals the change in its kinetic energy. The work calculation for a single piston head is as follows.

$$W = \frac{1}{2}m(v_2^2 - v_1^2) \xrightarrow{v_1=0} W = \frac{1}{2}mv_2^2 \tag{10}$$

The relationship between velocity, acceleration and force are as follows.

$$v = at \tag{11}$$

$$F = ma \Rightarrow a = \frac{F}{m} \tag{12}$$

Therefore, $$v = \frac{F}{m}t \tag{13}$$

To obtain the work on a single mirror the force, time and velocity equation are substituted into the work equation.

$$W_{singlemirror} = \frac{1}{2} \frac{\left(\sum_{n=0}^{z/4} \rho^{4n} p_1 A_m\right)^2 \left(\frac{zd}{c}\right)^2}{m} \tag{14}$$

For a reflectance that is nearly equal to one the force exerted on the second mirror is approximately equal to the force on the first mirror. Hence, the sum for work in a single containment chamber is as follows.

$$W_{containment\ chamber} \approx 2W_{singlemirror} = \frac{\left(\sum_{n=0}^{z/4} \rho^{4n} p_1 A_m\right)^2 \left(\frac{zd}{c}\right)^2}{m} \tag{15}$$

Power is the time rate of doing work. If a single chamber operated continuously, the power would have to account for a full operation or cycle of the cylinder that consists of compression and expansion phases where the force is applied during half the compression phase and removed during the expansion phase.

$$P_{containment\ chamber} = \frac{1}{4} \frac{W_{containment\ chamber}}{t} \tag{16}$$

or $$P_{containment\ chamber} = \frac{\left(\sum_{n=0}^{z/4} \rho^{4n} p_1 A_m\right)^2 \left(\frac{zd}{c}\right)}{4m} \tag{17}$$

For a photon engine with 4 containment chambers the power would be as follows.

$$P_{photonengine} = 4P_{containment\ chamber} = \frac{\left(\sum_{n=0}^{z/4} \rho^{4n} p_1 A_m\right)^2 \left(\frac{zd}{c}\right)}{m} \tag{18}$$

Now turning to FIGS. 1-7, these Figures illustrate several embodiments of an apparatus according to the invention. Specifically, each of FIGS. 1, 3, 5, and 7 depict an exemplary photon engine according to the invention and various devices for use therewith, also according to the invention. These Figures also depict devices for communicating or otherwise manipulating light waves, according to the invention. One of these inventive devices is a compression boundary light switch. Another of these devices is a primary prism capable of multiplying or splitting a light wave introduced therein (i.e., prior to introduction into the containment chamber) to increase its intensity.

FIG. 1 is a simplified schematic of a system and/or apparatus 100 that manipulates or otherwise communicates light or light waves and/or utilizes radiation pressure to generate mechanical work, each according to the invention. In particular, the apparatus 100 is a photon engine 100 that utilizes radiation provided by a light wave introduced into or manipulated by the apparatus. The inventive photon engine 100 preferably includes a primary prism 106 for receiving the light wave, a secondary prism 107 operatively and collectively associated with the primary prism 106, and a containment chamber 102 (as shown in dash lines in FIG. 1). The primary prism 106 and the secondary prism 108 are situated so as to abut face-to-face (or wall-to-wall) and to form a compression boundary interface 114. As discussed briefly above, the interface 114 may actually include, in one mode, a closeable or compressible air or vacuum gap between the two faces, as further discussed in respect to FIGS. 1a and 1b.

The exemplary photon engine 100 further includes substantially identical pairs of piston housings or cylinders 108, piston assembly 110, and reflective mirrors 112. The containment chamber 102 is defined by the front face of the secondary prism 107, the cylinders 108, and the mirrors 112. The highly reflective mirrors 112 are mounted on a planar surface of the moveable piston 110. The mirrors 112 and piston 112 travel together within the cylinders 108. As will also be described below, the piston assembly 110 may be mechanically connected with a crank shaft assembly and the like.

As is apparent from FIG. 1, movement of the reflective mirrors 112 and piston assembly 110 allows for the volume of the containment chamber 102 to increase or decrease, at least on either side of the secondary prism 107. Preferably, the mirrors 112 will move in unison (as part of a larger piston/crank shaft assembly). Moreover, the compression boundary between the primary prism 106 and secondary prism 107 operates as a light switch 114, also according to the invention. As discussed above, the light switch 114 may be operated by way of a piezoelectric drive mechanism 116 that drives the closing of the air gap (through compression) to allow light to pass into the containment chamber 102. Operation of the drive mechanism 116 determines, therefore, the open and close modes of the light switch 114, in a controlled manner.

The photon engine 100 preferably utilizes quartz material for the primary prism 106 and the secondary prism 107. More specifically, the photon engine 100 provides a compression boundary light switch that operates on two fundamental principals or properties of quartz: the piezoelectric effect and total internal reflection (TIR). The piezoelectric effect occurs when quartz is placed in an electric field. Specifically, quartz expands in the presence of an electric field. The crystalline structure of quartz has three primary axis: X, Y, and Z. By placing an electric field oriented along its X-axis, the quartz will expand or contract based on the direction of the electric field. If the electric field results in a compression along the X-axis, then the quartz will expand along or in the Y-axis. By constraining the quartz along the Y-axis during expansion, stress is generated in the quartz along the Y-axis. This generation of stress and the resulting strain in the Y-axis by an electric field oriented along the X-axis is utilized to compress the two pieces of quartz (i.e., primary prism 106 and secondary prism 107.

Figure 1A:
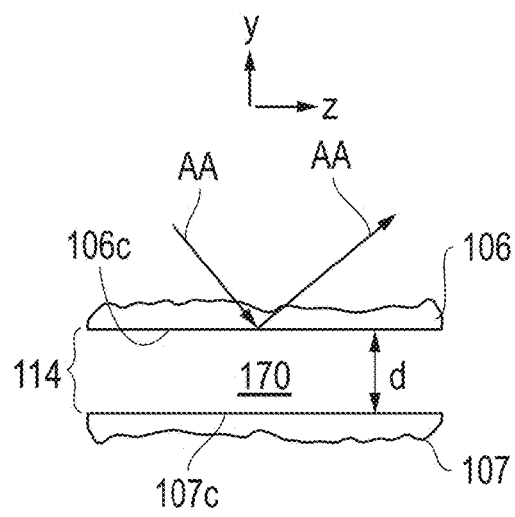
FIG. 1a is a detail illustration of a compression boundary interface in the close mode, according to the invention.

FIG. 1a depicts a detailed schematic of the compression boundary interface 114 while in the closed or non-operative mode. In this mode, the back face 106c of the primary prism 106 is spaced from the front face 107c of the secondary prism 107. Given Snell's Law and the incident angle, the index of refraction of both prisms are sufficiently similar (e.g., preferably within about 5% to about 20% of each other) to facilitate operation of the light switch in the open mode. Also, the indices of refraction for both prisms are sufficiently dissimilar from the void (or air space) to facilitate operation of the light switch in the closed mode. As a result, an air gap 170 is provided between the two faces 106c, 107c. In the present description, the compression boundary or interface 114 is used to refer to the air gap 170 and the faces 106c, 107c. FIG. 1A also shows the coordinates or axes X, Y of the quartz or primary prism 106. Typically, the air gap 170 will have a depth of about 2000 nanometers to 50 nanometers, and more preferably, between about 1000 nanometers to 100 nanometers, in the closed or non-operative mode.

Figure 1B:
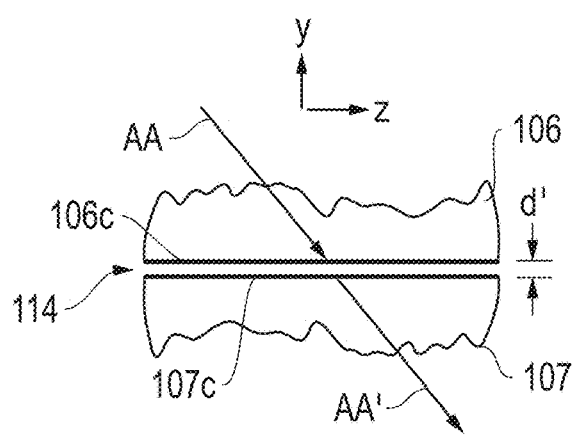
FIG. 1b is a detail illustration of the compression boundary interface in the open mode, according to the invention.

FIG. 1b illustrates the compression of the compression boundary 114 upon operation of the piezoelectric drive mechanism 116. The result is that the air gap 170 is compressed to about 100 nanometers to 0 nanometer, upon application or excitation of the electric field. As discussed above, application of the electric field results in contraction along in the X-axis direction, which generates stress in the Y direction (as a result of the quartz material or face 106c being prevented from expanding in the Y direction). Preferably, application of the drive mechanism 116 will be applied to both the primary prism 106 and secondary prism 107, or more specifically, the faces 106c and 107. Preferably, the air gap 170 will be compressed to a depth of about 100 nanometers to about 0 nanometer, and more preferably to a depth of about 50 nanometers to about 0 nanometer.

FIGS. 1a and 1b are also used to indicate the communication of the light wave AA through the primary prism 106 and/or compression boundary 170, according to the invention. In FIG. 1a, the light wave AA impacts the back face 106c at an incident angle of about 45°. Due to the index of refraction provided also by the air gap 170, the light wave AA reflects due to TIR in a direction that is generally 90° to its incident angle. In FIG. 1b, because the air gap 170 is substantially eliminated, and the quartz material of the secondary prism 107 is substantially similar to that of the primary prism 106, the two faces 106c, 107c, function as one single medium. That is, the effect of a different index of refraction (provided by the air gap 170) is eliminated. Accordingly, the light wave AA passes through the face 106c and through the face 107c of the secondary prism 107 without interruption.

Snell's Law describes the effect when radiation, or electric magnetic waves, pass from one media to the other. The resulting angle is a function of the incident angle in the index of refraction for both media. If the result of Snell's Law is an imaginary number, the electromagnetic wave is TIR. The photon engine 100 according to the invention utilizes this phenomenon to contain light waves within the primary prism (as is described in respect to a further embodiment).

By coupling TIR and removal of the TIR boundary through piezoelectric compression, a light switch according to the invention is produced. In the off-mode, with no voltage applied, the light is TIR and remains outside the containment chamber 112. When the voltage is applied, the light switch is said to be in the on-mode and the TIR boundary is removed. This allows the light wave to pass through the compression boundary or interface CC, and into the containment chamber 112. Accordingly, an important step of the inventive method, the light switch is actuated on and than off quickly, so as to capture or contain light.

Preferably, the drive mechanism 116 includes a source of high voltage, low current (near electrostatic) that sends the signal to the piezoelectric quartz or prism 106, 107. Mechanical connections is provided by copper plates, for example, attached to the appropriate faces of the primary and secondary prisms 106, 107. The drive mechanism further includes a field effect transistor for providing switching at a very quick (gigahertz) pulse. Most preferably, the pulse is open for a nanosecond and then off for a millisecond.

FIG. 2 is a schematic of one embodiment of the moveable assembly comprising piston 210 and mirror 212. The assembly is characterized by a mass m (and a particular area) and reflectivity ε. In operation, the mirror surface is irradiated by a light flux $p_1$ over a distance d by radiation transmitted through a compression boundary 214 and into secondary prism 207. The radiation pressure p collectively generates a mechanical force that acts on the mirror 212 and piston assembly 210.

Figure 3:
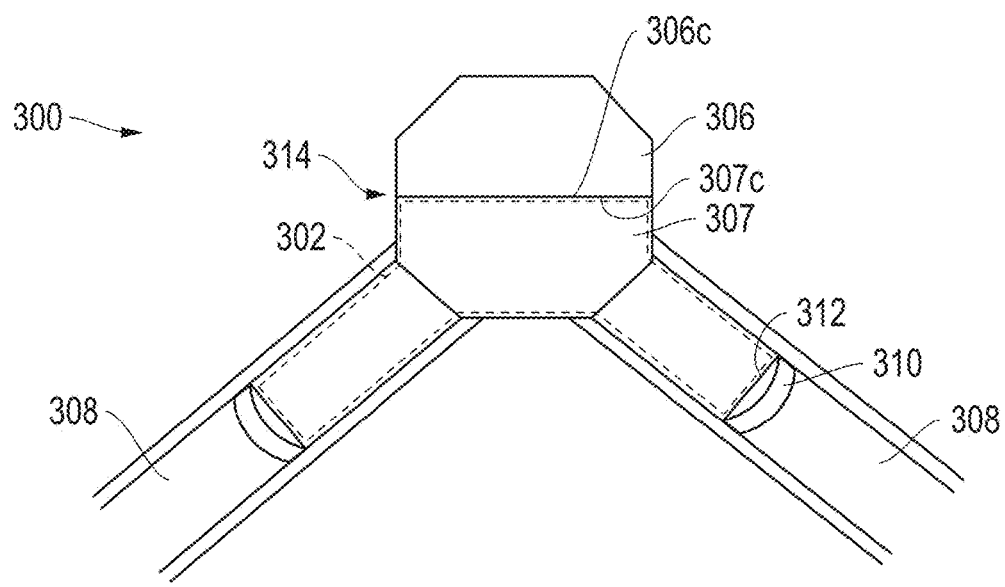
FIG. 3 is a simplified schematic of an alternative embodiment of a photon engine according to the present invention.

Now turning to FIG. 3, there is illustrated an alternative embodiment of a photon engine 300 according to the invention. In the depicted variation, wherein like reference numerals are used to refer to like elements, a primary prism 306 is situated adjacent a secondary prism 307. In particular, a back face 306c of primary prism 306 is spaced from a front face 307c of secondary prism 307, to form a compression boundary interface 314 between the primary prism 306 and the containment chamber 302. The boundary interface 314 provides for an octagonal cross section switch element in this embodiment. In all other aspects of the design and operation, the photon engine 300 is substantially similar to that depicted in FIG. 1. As with the photon engine 100 of FIG. 1, the photon engine 300 includes a pair of cylinders 308, a piston 310 moveably accommodated therein, and a highly reflective mirror 312 mounted on the piston 310.

Figure 4A:
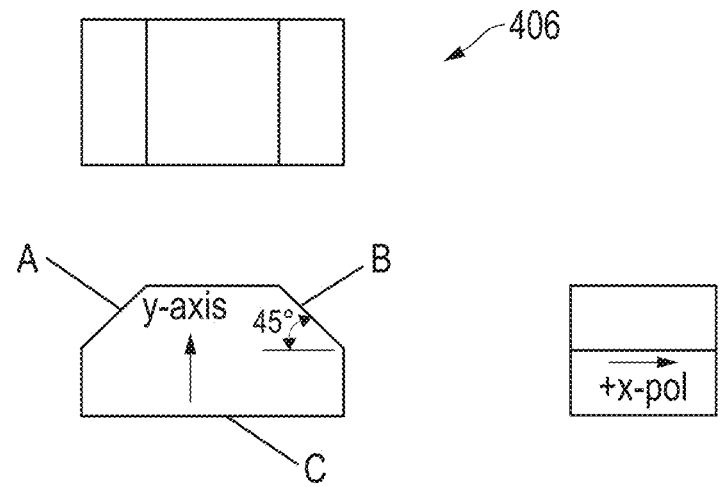
FIGS. 4a and 4b are illustrations of prisms that may be used in conjunction with a photon engine according to the present invention.
Figure 4B:
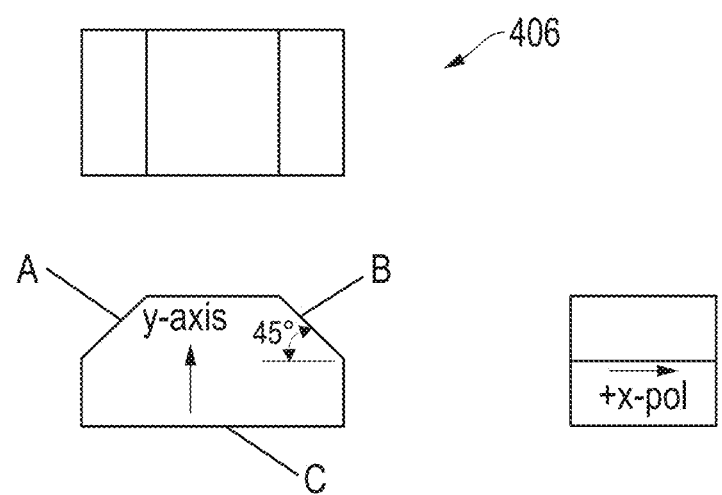

FIGS. 4a and 4b illustrate prisms 406 of various geometric configurations suitable for use as a primary prism in the present invention. The prisms 406 are preferably made of crystalline quartz material with an index of refraction that is greater than 1.45. In practice, it is important to provide for highly polished surfaces through or from which light waves will refract, pass, or reflect. In the prisms 406 of FIG. 4, faces A, B, and C are polished for this purpose.

Figure 5:
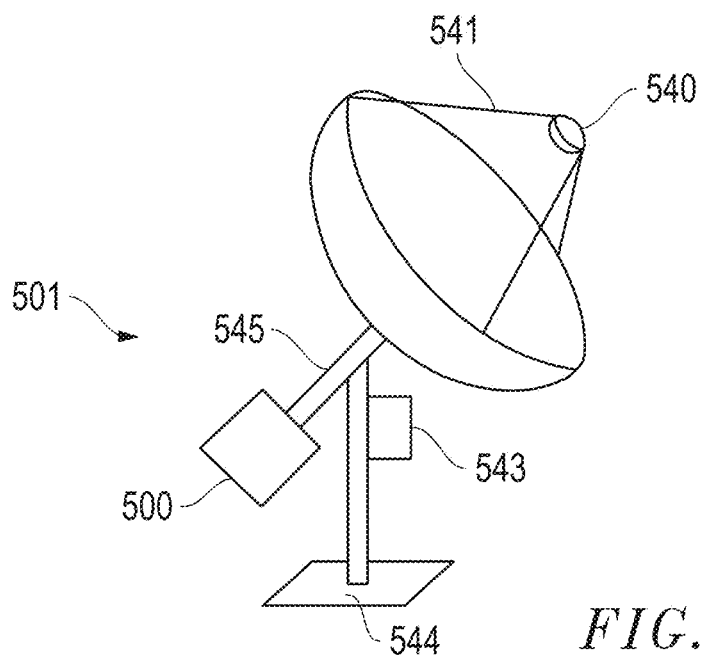
FIG. 5 is a simplified schematic of yet another embodiment of the inventive apparatus.

FIG. 5 depicts a simplified schematic of a system 501 for converting radiant energy into a different form of energy or work, according to the invention. The system 501 utilizes a photon engine 500 as described previously. Furthermore, the system 501 utilizes a primary collective mirror 541 having an inner parabolic surface that may be covered or coated with a 3M™ radiant light film. The system 501 may further include or utilize at least a secondary collector mirror 540 mounted above the primary collector 541 and positioned to reflect light waves reflecting from the inner parabolic surface of the primary collector 541. The secondary collector 540 is characterized by a smaller surface, but may advantageously be covered or coated with 3M™ radiant light film on an outer surface. The system may be further equipped with a light guide 545 for communicating concentrated light from the secondary collector mirror 540 and the primary collector mirror 541 to the photon engine 500. Preferably, the system 501 will include a stand and base assembly 544, and a pointing controller 543 for directing the system 501 towards a radiation source.

Figure 6A:
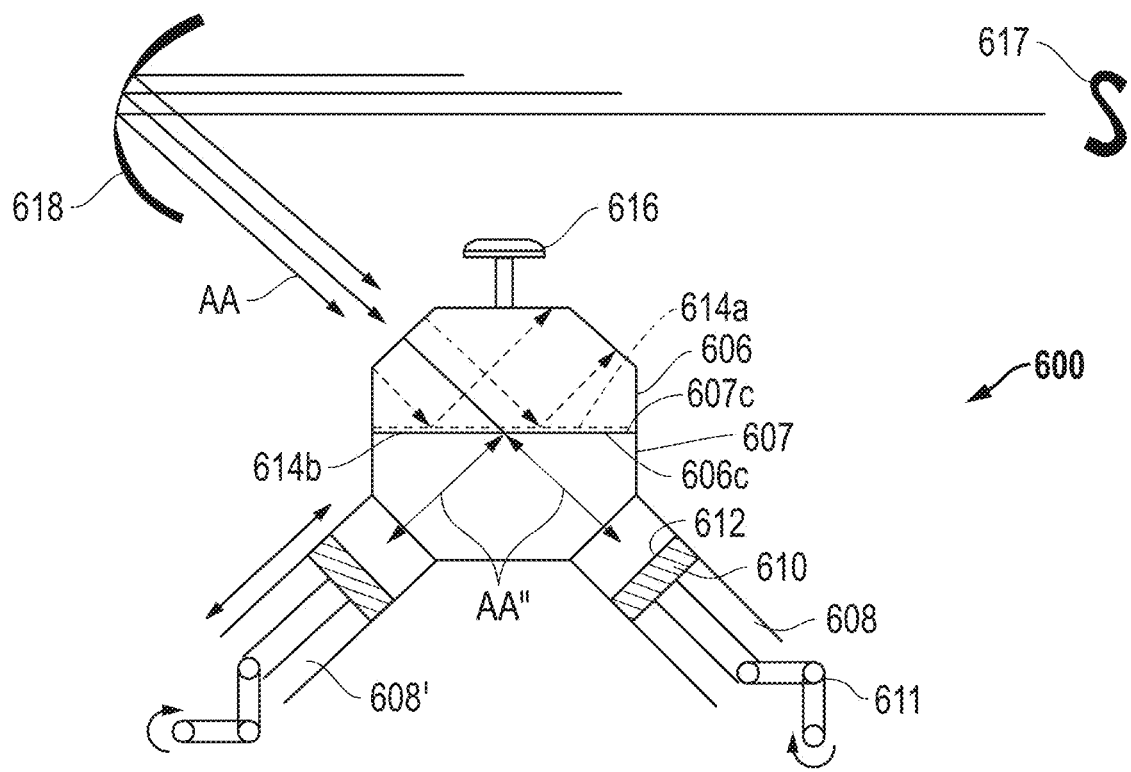
FIG. 6a is a simplified plan view schematic illustrating an alternative apparatus and a method of operating the apparatus, according to the invention.
Figure 6B:
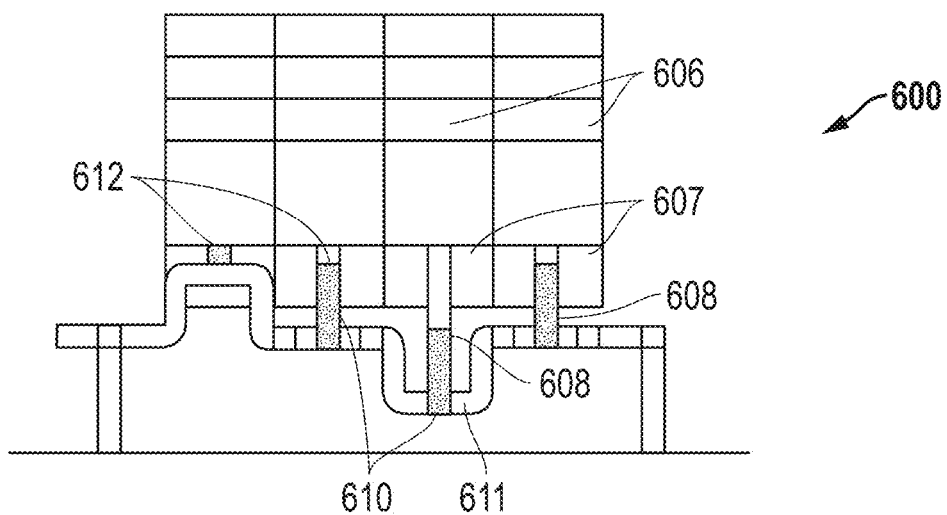

FIGS. 6a and 6b are simplified schematics further illustrating a variation of the inventive photon engine, in particular, a multi-cylinder photon engine 600. These two figures are also illustrative of the operation of the inventive engine 600. FIG. 6a provides a front view of the engine 600, including two cylinders 608, 608' which reciprocate in unison. In the side elevation view of FIG. 6b, the four cylinders 608 on one side of the photon engine 600 are shown. The cylinders 608 accommodate travel of a piston assembly 610 that is operatively connected to crank shaft assembly 611.

Turning to FIG. 6a, the photon engine 600 includes an octagonal shape primary prism 606 positioned adjacent a similarly shaped secondary prism 607, via compression boundary interface 614 formed at least partially by back and front faces 606c, 607c, respectively. The secondary prism 607 communicates with each of cylinders 608, 608' and thus the mirror 612 and piston 610 in each of the cylinders 608, 608'. In the side elevation view of FIG. 6b, four primary prisms 606 and four secondary prisms 607 are shown, each pair being operatively associated with a pair or a bank of cylinders 608 and the piston 610 and crank assemblies 611 situated therein.

Turning to FIG. 6a, the compression boundary interface 614 is operatively driven by a prism piezoelectric drive mechanism 616 to operate the opening or closing of compression boundary light switch (CBLS), as described previously. In FIG. 6a, the interface denoted by 614a is used to show the light switch in the closed position (in dash lines) while reference numeral 614b is used to denote the light switch in the open position. FIG. 6a further illustrates the source of light waves 617 provided externally of the photon engine 600. The light waves 617 are first captured or concentrated via collector mirror 618 and redirected as instant radiation into the primary prism 606 (see arrows AA). The light waves AA impact the back face 606c at an incident angle of about 45°. If the light switch is in the closed position (denoted by dash line and ref. no. 614a), the light waves AA reflect off the interface 614a (see dash lines) and are redirected through another face of the prism 606 (and exits the primary prism 606).

When the interface 614 is in the open position (denoted by solid line and ref no. 614b), the light waves AA travels through the interface 614b and enter the containment chamber 602 and impact the back face 606, as shown by arrows AA'. Further, the prisms 606 and 608 are configured such that the light waves AA' enter the containment chamber 608 and are directed straight into the cylinder 608. Thus, the light wave AA' contacts the mirror surface 612 at a preferably generally normal angle and as a result, a relatively high degree of reflectance is achieved. As illustrated, a reflected light wave reflects generally straight back towards the open interface 614b, which is now in a closed position, and impacts the interface at about a 45° angle. Accordingly, the reflected light wave AA' reflects off the closed interface 614b in a direction of the second cylinder 608 of the containment chamber 602. As previously described, the reflected light wave AA' also impacts the second mirror 612 at a generally normal orientation and reflects back at a normal orientation (and at a high degree of reflectance). Accordingly, the light wave AA' reflects along the same path from which it traveled to reach the second mirror 612. In one respect, a predetermined light path is defined by the orientations of the prisms 606, 607, the cylinder 608, 608', among other components. Such a predetermined light path is represented by the bi-directional arrows AA' in FIG. 6.

As also described previously, contact of the light wave AA' on the surface of the mirror 612 generates radiation pressure thereon. This radiation pressure acts to displace the mirror 612 and piston 610 assembly a distance which is denoted by "X" in FIG. 6 (thereby generating work). Moreover, this displacement causes crank shaft assembly 611 to turn thereby generating mechanical energy. In another mode, the drive mechanism 614 may be operated in a frequency modulated mode so that the opening and closing of the light switch allows light to enter the secondary prism 607 on a time scale that is related to the frequency of the radiation inside the secondary prism 607. In this way, the radiation pressure on piston 612 assemblies is reinforced.

The simplified schematics of FIG. 7 illustrates yet another alternative embodiment of the photon engine according to the invention, wherein like reference numerals are used to indicate like elements. In particular, FIG. 7a depicts an arrangement of a primary prism 706 and a secondary prism 707 that utilizes a light beam expander/contractor 762 embedded in the primary prism 706. Specifically, the light beam expander/contractor 770 functions to split the light beam multiple times and redirect it upon itself, thereby increasing the intensity of the light wave ultimately introduced into the containment chamber 702a.

In the embodiment of FIG. 7, the primary prism 706a has an octagonal shape, and thus, has eight faces or walls 708a-708h (only some of which are shown). As in previous embodiments, the primary prism 706 is preferably made of a quartz material. The primary prism 706 includes a protrusion 760 extending from the first face 708a, that serves as a beam inlet 760. The beam inlet 760 preferably has a concentrated, circular shape. Further, another face 706c of the primary prism 706 is positioned adjacent to and spaced apart from a front face 707c of the secondary prism 708 to form a compression boundary interface 714. As discussed above, the interface 714 provides for a compression boundary light switch upon operation by the proper drive mechanism, in accordance with the present invention.

Figure 7B:
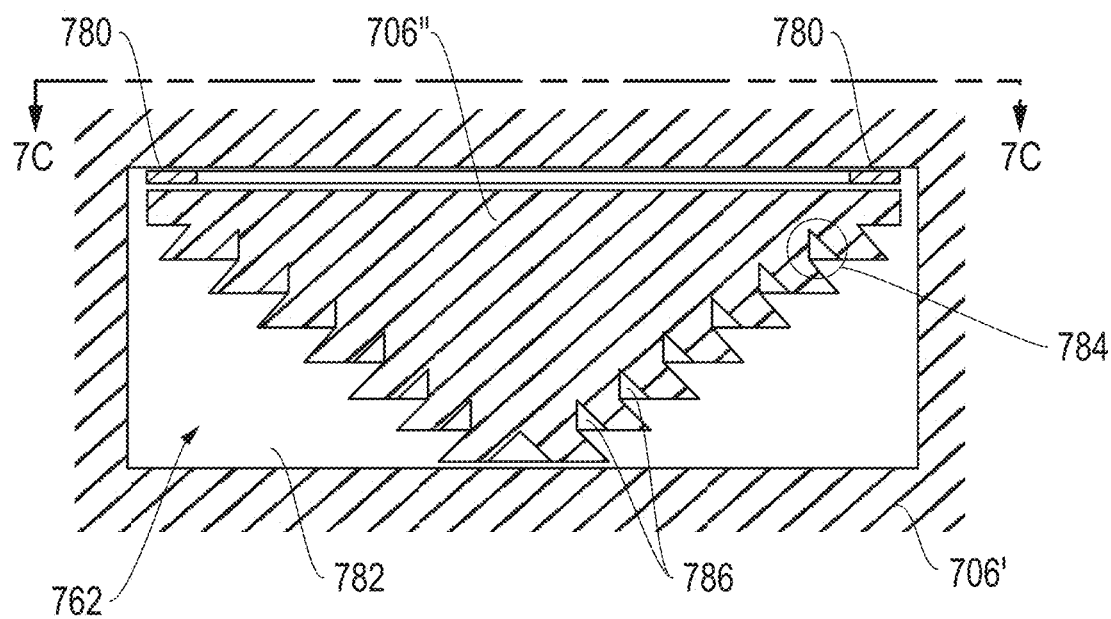
FIG. 7b is a detailed cross-section of a light expander/contractor as shown in FIG. 7a, according to the invention.
Figure 7D:
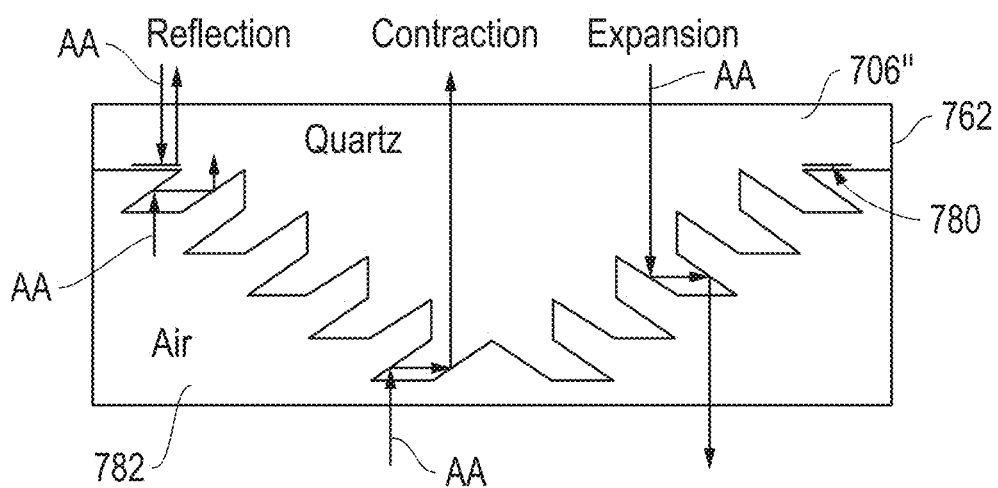
FIG. 7d is a schematic view illustrating operation of the light expander/contractor, according to the invention.
Figure 7C:
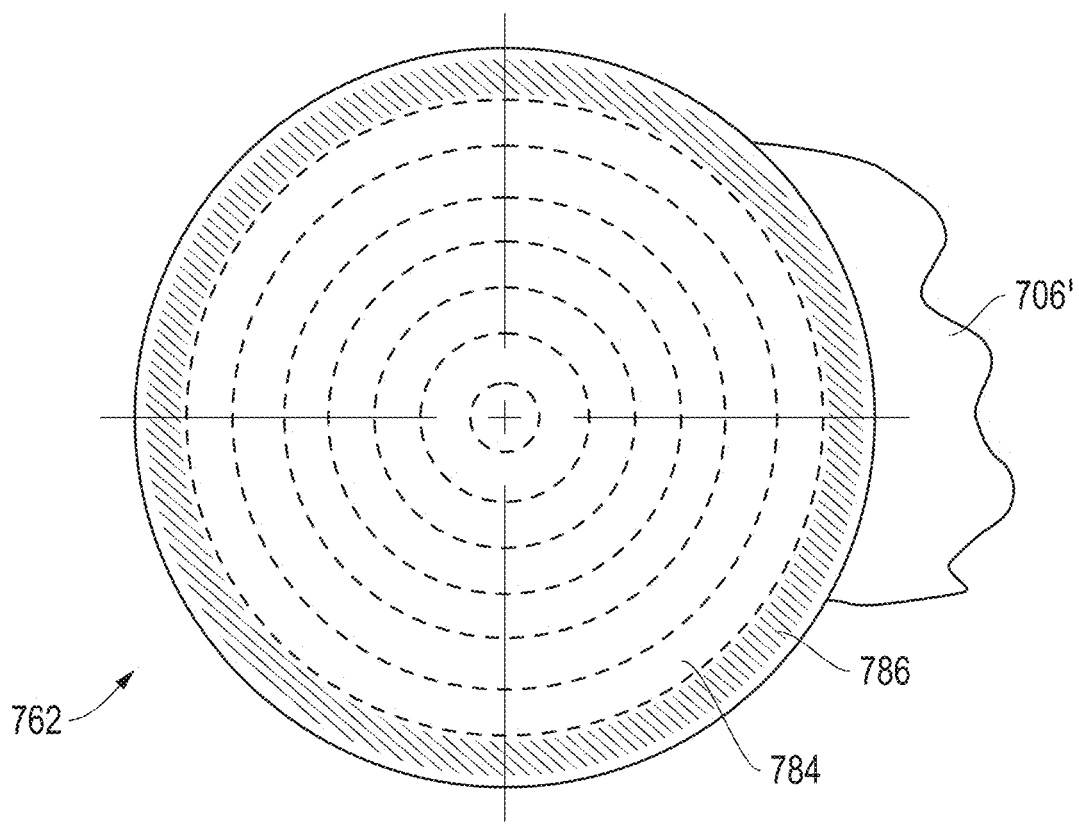
FIG. 7c is a plan view of the light expander/contractor of FIG. 7a, according to the invention.

Referring to the detailed view of FIG. 7b, in yet another aspect of the invention, the primary prism 706 is equipped with a light beam expander/contractor 762 positioned internally of the primary prism 706 and embedded in the quartz material 706'. FIGS. 7c and 7d provide further detail illustrations of the expander/contractor 762.

Returning to FIG. 7d, the light expander/contractor 762 is a faceted quartz block embedded in the quartz material 706'. Physically, the light expander/contractor 762 is a carved, circular section of quartz material 706' having concentric air interfaces 786 cut therein. The faceted quartz block 762 is centered on an incoming light beam AA having a given diameter. As shown in FIG. 7b, the quartz block 762 (i.e., the light expander/contractor 762) provides a set of concentric 45° facets of quartz-air interfaces. The cross hatch section illustrates the quartz material 706' of the primary prism 706 as well as the quartz material 706" of the quartz block 762. The remaining non-cross hatch areas are air or vacuum interfaces 782, which are void of the quartz material. More importantly, these air interfaces 782 have optic properties (i.e., index of refraction) different from that of the quartz material. FIG. 7b and the plan view of FIG. 7c, also depict a concentric mirror 780 providing the outer cylinder of the concentric interfaces. As will be explained below, the mirror 780 functions to reflect the outer most diameter concentric cylinder of light during operation, thereby reversing the light path and beginning the process of light contraction.

The schematic of FIG. 7d is provided an illustration of how the inventive light expander/contractor 762 communicates or otherwise manipulates a light beam AA traveling through the primary prism 706. In a first mode of communication, the light beam $AA_E$ reflects upon the 45° quartz-air interface 784. Each incident beam experiences two 90° reflections in the outward direction, thereby converting the diameter of the beam to a larger (expansion) diameter. In the reverse mode, the light beam $AA_{CS}$ again hits the quartz-air interface 784 and experiences again two 90° reflections that converts the diameter to a smaller (contraction) diameter.

Figure 7G:
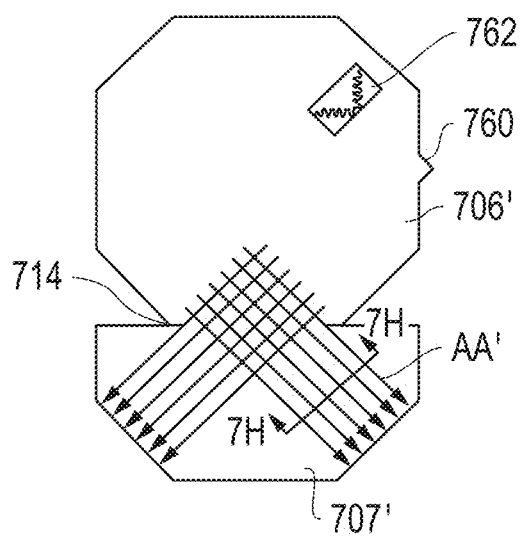
FIG. 7g is a simplified illustration of operation of the primary and secondary prisms, according to the invention.
Figure 7H:
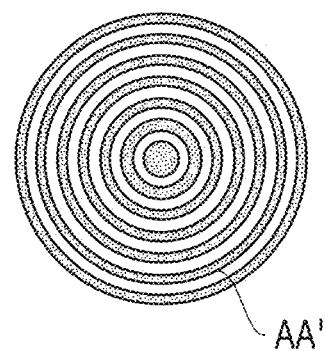
FIG. 7h is a plan view of a light beam pattern resulting from operation of the light expander/contractor, according to the invention.
Figure 7I:
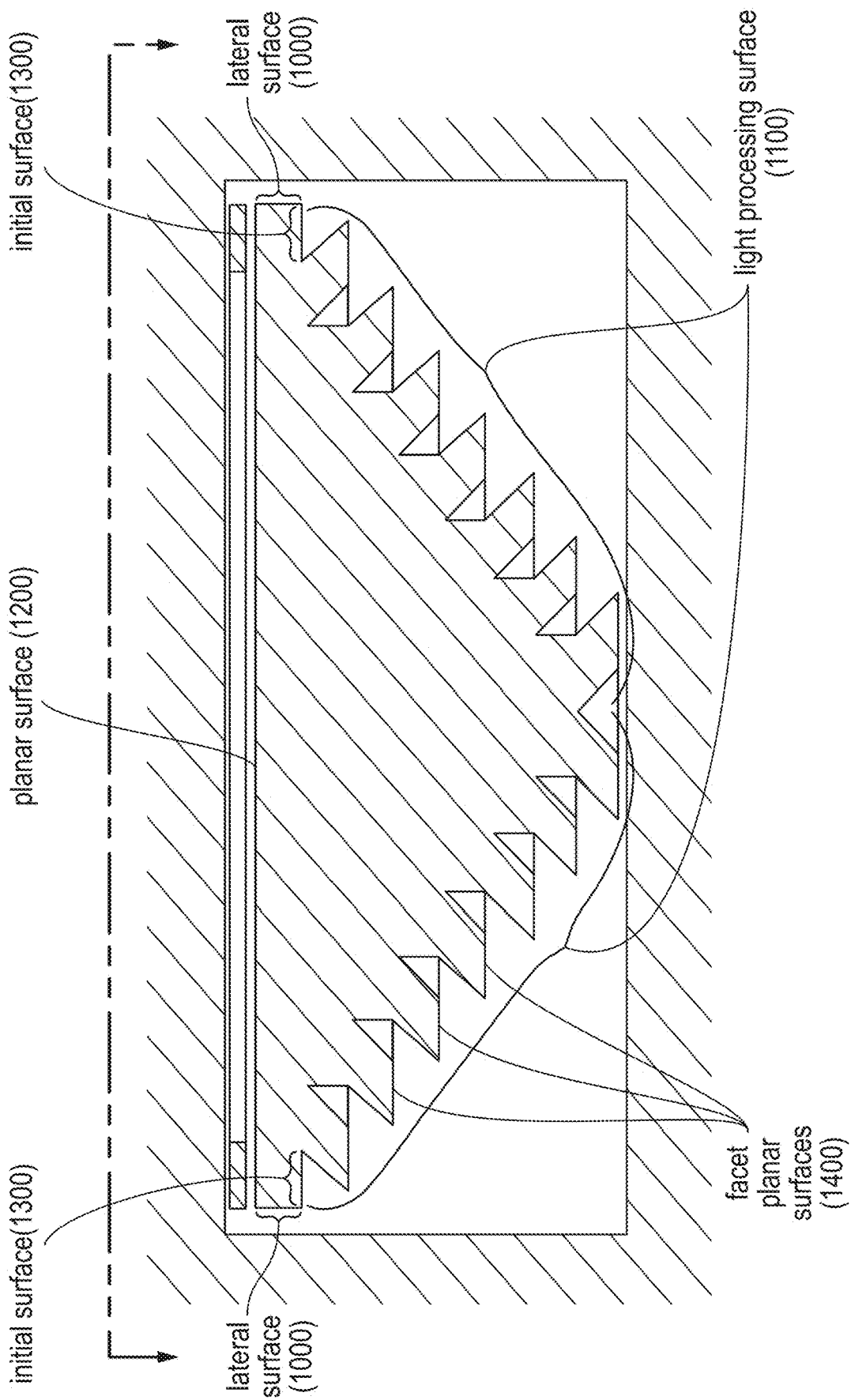
FIG. 7I is a detailed cross section of a light expander/contractor device as shown in FIG. 7B in which the following are labeled: the lateral surface (1000); the light processing surface (1100); the planar surface (1200); the initial surface (1300); and, the facet planar surfaces (1400).

The light expander/contractor 762 provides, therefore, three operations: light expansion, light reflection, and light contraction. Light reflection ($AA_L$) occurs once the light beam AA has been expanded to the largest concentric cylinder. This is prompted by reflection off of mirror 780, which reverses the direction of the light $AA_L$. Once the light beam has been completely expanded and contracted, the light switch (compression boundary interface 714) is activated, thereby allowing the containment chamber 702 to be filled in two directions, as shown in FIG. 7g. FIG. 7h illustrates the resulting beam pattern acting on the mirror 710 and piston assembly 712, after the beam flux has been multiplied in the primary prism 706. Once all of the light is injected into the containment chamber 702, the light switch is returned to the closed position so that the resulting beam is contained in the containment chamber 702. The multiplication of the light beam flux from the primary prism 706 results, therefore, in a higher power output.

FIGS. 7e and 7f illustrate general operation of the primary prism 706, while the compression boundary light switch is in the closed or off mode. Collected light beam AA is introduced into the primary prism 706 at a generally normal angle through beam inlet 760. Preferably, the beam inlet 760 is located such that the light beam AA introduced into the primary prism 706 is directed towards the back face 706c and compression boundary interface 714. Initially, the light switch is in the closed or reflective stage. Thus, the light beam AA reflects at a generally normal angle and toward another face 706e of the primary prism 706. The incident angle of this reflected light beam AA is such that the light beam AA will also reflect off the prism face 706e (and subsequent face 706g) at a generally normal angle. Accordingly, as illustrated in FIG. 7e, the light beam AA initially rotates around the primary prism 706 due to total internal reflection.

Preferably, the collected beam AA enters the primary prism 706 and experiences three light reflections before entering the beam expander/contractor 762. The direction at which the light beam AA enters the expander/contractor 762 determines whether the beam AA is expanded or contracted. In FIG. 7e, the light beam AA is shown rotating within the primary prism 706 in the clockwise direction. In this direction, the light beam entrance into the beam expander/contractor 762 results in the light beam AA being expanded. Conversely, the light beam AA may be directed within the primary prism in a counter clockwise direction. As illustrated in FIG. 7f, the light beam AA enters the expander/contractor 762 such that the resulting light beam will be contracted. With each rotation and introduction into the beam expander/contractor, the resulting light beam AA expands or contracts to the next level of concentric cylinders. Expansion is, however, limited by the reflected mirror 780 at the largest level of concentric cylinders. At this point, the direction of the light beam AA is reversed thereby reinitiating the process of contraction.

It should be understood, however, that various arrangements and deployments of the components of inventive apparatus in accordance with the invention may be made and will vary according to the particular environment and applications. However, in any such applications, various aspects of the inventions will be applicable, as described above. For example, various aspects of the photon engine, such as the containment chamber design, the optical switching devices, and the light multiplier or light wave intensifier may be incorporated with other engine or mechanical work devices. As a further example, the piston and cylinder assembly may be replaced by another energy system such a energy storage device (e.g., a spring device).

The foregoing description of the present invention has been presented for purposes of illustration and description. It is to be noted that the description is not intended to limit invention to the apparatus, and method disclosed herein. Various aspects of the invention as described above may be applicable to other types of engines and mechanical work devices and methods for harnessing radiation pressure to generate mechanical work. It is to be noted also that the invention is embodied in the method described, the apparatus utilized in the methods, and in the related components and subsystems. These variations of the invention will become apparent to one skilled in the optics, engine art, or other relevant art, provided with the present disclosure. Consequently, variations and modifications commensurate with the above teachings and the skill and knowledge of the relevant art are within the scope of the present invention. The embodiments described and illustrated herein are further intended to explain the best modes for practicing the invention, and to enable others skilled in the art to utilize the invention and other embodiments and with various modifications required by the particular applications or uses of the present invention.

What is claimed is:

1. A light expander/contractor device comprising:
   a faceted quartz structure comprising a lateral surface communicating with a light processing surface at one end and communicating with a planar surface at an opposed end;
   the light processing surface comprising an initial surface extending from the lateral surface substantially parallel to the planar surface and having a distal end spaced from the lateral surface, the light processing surface further comprising multiple levels of facets comprising interfaces selected from the group consisting of quartz-air interfaces and quartz-vacuum interfaces;
   each level of facets comprising (a) a proximal facet surface relative to the lateral surface, the proximal facet surface extending away from the initial surface and toward the lateral surface at a 45° angle relative to the initial surface to communicate with (b) a facet planar surface spaced apart from and parallel to the initial surface to communicate with (c) a distal facet surface adjacent and substantially parallel to the proximal facet surface.

2. The light expander/contractor device of claim 1 wherein the distal facet surface of each level of facets communicates with (d) a connecting surface that is substantially parallel to the lateral surface and in communication with a proximal facet surface of a next level of facets.

3. The light expander/contractor device of claim 2 wherein lateral ends of the planar surface comprise a mirror.

4. The light expander/contractor device of claim 3 embedded in a primary prism comprising polished crystalline quartz having a first index of refraction, the primary prism comprising one or more light beam inlets and a primary back face.

5. The light expander/contractor device of claim 2 embedded in a primary prism comprising polished crystalline quartz having a first index of refraction, the primary prism comprising one or more light beam inlets and a primary back face.

6. The light expander/contractor device of claim 1 wherein lateral ends of the planar surface comprise a mirror.

7. The light expander/contractor device of claim 1 embedded in a primary prism comprising polished crystalline quartz having a first index of refraction, the primary prism comprising one or more light beam inlets and a primary back face.

8. A light expander/contractor device comprising:
a conical faceted quartz structure comprising a lateral surface communicating with a light processing surface at one end and communicating with a planar surface at an opposed end;
the light processing surface comprising an initial surface extending from the lateral surface substantially parallel to the planar surface and having a distal end spaced from the lateral surface, the light processing surface further comprising multiple levels of facets comprising interfaces selected from the group consisting of quartz-air interfaces and quartz-vacuum interfaces;
each level of facets comprising (a) a proximal facet surface relative to the lateral surface, the proximal facet surface extending away from the initial surface and toward the lateral surface at a 45° angle relative to the initial surface to communicate with (b) a facet planar surface spaced apart from and parallel to the initial surface to communicate with (c) a distal facet surface adjacent and substantially parallel to the proximal facet surface;
wherein the distal facet surfaces of penultimate facets intersect to form a V structure.

9. The light expander/contractor device of claim 8 wherein the distal facet surface of each level of facets communicates with (d) a connecting surface that is substantially parallel to the lateral surface and in communication with a proximal facet surface of a next level of facets.

10. The light expander/contractor device of claim 9 wherein lateral ends of the planar surface comprise a mirror.

11. The light expander/contractor device of claim 10 embedded in a primary prism comprising polished crystalline quartz having a first index of refraction, the primary prism comprising one or more light beam inlets and a primary back face.

12. The light expander/contractor device of claim 9 embedded in a primary prism comprising polished crystalline quartz having a first index of refraction, the primary prism comprising one or more light beam inlets and a primary back face.

13. The light expander/contractor device of claim 8 wherein lateral ends of the planar surface comprise a mirror.

14. The light expander/contractor device of claim 8 embedded in a primary prism comprising polished crystalline quartz having a first index of refraction, the primary prism comprising one or more light beam inlets and a primary back face.

* * * * *